United States Patent Office 3,692,474
Patented Sept. 19, 1972

3,692,474
PREPARATION OF METAL NITRIDES
Scott Gordon Arber, Chessington, and Oswald William John Young, Surbiton, England, assignors to United States Borax & Chemical Corporation, Los Angeles, Calif.
No Drawing. Continuation-in-part of application Ser. No. 795,083, Jan. 29, 1969, now Patent No. 3,607,042. This application Nov. 3, 1970, Ser. No. 86,615
Claims priority, application Great Britain, Nov. 26, 1969, 57,947/69
Int. Cl. C01b 21/06; C01f 7/00
U.S. Cl. 423—344                                10 Claims

ABSTRACT OF THE DISCLOSURE

Refractory metal nitrides, such as aluminum nitride, are produced by heating a mixture of the refractory metal, carbon and a zinc or cadmium compound in the presence of nitrogen at a temperature of at least about 950° C. The zinc or cadmium compound is reduced to the corresponding elemental metal and evaporated from the reaction mass to leave the desired nitride.

---

This is a continuation-in-part of our copending application Ser. No. 795,083 filed Jan. 29, 1969, now U.S. Pat. 3,607,042.

This invention relates to the preparation of nitrides of metals. By the term "metals" we mean not only those elements regularly presented as metals in the Periodic Table of the elements, but also boron and silicon.

Our above-identified copending application describes a process for the preparation of boron nitride in which a boron compound containing oxygen is nitrided to form boron nitride while dispersed on a support comprising a zinc or cadmium compound which is reduced during the process to elemental zinc or cadmium which is then evaporated. In one form of the process of our copending application carbon is added to the zinc compound to ensure its carbothermic reduction to elemental zinc or cadmium. We have now found that, with appropriate control of other features of the process, the invention of our earlier application can be modified by using as starting material the element whose nitride is to be formed, in place of a compound of the element. Thus in modifying the process of our earlier application, in place of boric oxide we would use elemental boron. Furthermore, by the process of the present application there can be prepared nitrides of metals other than boron.

Our process is particularly effective for the preparation of aluminum nitride from elemental aluminum. A previous method for the preparation of aluminum nitride comprises the direct action of nitrogen gas (or of ammonia which dissociates to provide nitrogen) on powdered aluminum; the product so-formed contains appreciable amounts of unreacted aluminum metal. Another known method for preparing aluminum nitride is to react nitrogen with carbothermically reduced aluminum oxide, but the product of this process has a high content of oxygen.

According to the present invention there is provided a process for the preparation of a metal nitride which comprises contacting a mixture containing particles of the said metal, carbon, and a zinc or cadmium compound capable of carbothermic reduction to elemental zinc or cadmium, respectively, with nitrogen at a temperature sufficient for the carbothermic reduction of said compound, and evaporating the elemental zinc or cadmium formed.

Although the process is especially useful for the preparation of aluminum nitride, other refractory nitrides such as boron nitride and silicon nitride as well as the nitrides of titanium, zirconium, hafnium and niobium can also be prepared by our invention.

In the present process the mixture is desirably in the form of aggregates or shaped bodies, which can be made either by compacting the mixture under pressure, or by mixing the components with water to form a paste which is molded to aggregate form.

In carrying out the process, the mixture of aluminum or other metal, carbon, and the zinc or cadmium compound is preferably contacted with nitrogen supplied in the form of nitrogen gas, but as an alternative it is possible to use a gas such as ammonia which dissociates at the reaction temperature to provide nitrogen. However, this is not generally recommended since ammonium cyanide can be formed.

The temperature during the reaction must exceed the boiling point of zinc or cadmium sufficiently to volatilize all the metal, preferably at least about 950° C. The reaction can however, begin at lower temperatures, such as 800° C. and then be slowly raised to as high as about 1900° C. Although such temperatures for the conversion of aluminum to aluminum nitride are much higher than the melting point of aluminum (660° C.) it has been found that the aggregates containing the elemental metal retain their shape.

A suitable zinc or cadmium compound for the process of this invention is the oxide, but a zinc or cadmium salt which readily decomposes to yield the oxide can be used instead. Examples of such salts include the halides, borates, nitrates, etc.

The particles of metal used in this process are preferably fine-sized, that is smaller than about 150 British Standard Mesh (less than or equal to about 100μ). In the course of the reaction the zinc or cadmium compound acts as a carrier or disperser for the metal so that some metal is nitrided while the zinc or cadmium compound is reduced to elemental zinc or cadmium. As the zinc or cadmium is volatilized, metal nitride already formed serves as a carrier for the remaining metal permitting that also to be converted to the metallic nitride.

The carbon can be for example graphite or lampblack and preferably has a low ash content. The quantity of carbon in the mixture must be at least that stoichiometrically necessary for the carbothermic reduction of the zinc or cadmium compound to the element. Preferably there is a stoichiometric excess of carbon in order to remove oxide present on the surface of the starting material and to prevent the formation of oxide during the reaction. The final product may thus have a carbon content of 1 to 10%, but the carbon content can be controlled by control of the stoichiometric excess of carbon.

In a preferred embodiment of the invention, the aggregates containing the particulate element, the carbon and the zinc or cadmium compound are maintained at the desired temperature while a stream of nitrogen gas or equivalent gas is passed in contact with the heated aggregates; it is especially preferred to raise the temperature progressively during the reaction, such as from an initial temperature of about 800° C. to a final temperature of about 1900° C.

The invention will now be further described in the following examples.

EXAMPLE 1

A mixture containing 61% by weight zinc oxide, 27% by weight aluminum powder having a particle size finer than 150 B.S. mesh, and 11% carbon (an excess of 2% carbon over that stoichiometrically necessary) was divided into two parts. One part of the mixture was formed into aggregates by compaction with a hydraulic press while the other part was mixed with water, extruded, shaped by hand to small aggregates and dried. The aggregates formed by both methods were then separately converted to aluminum nitride. The aggregates were placed in a vertical furnace having an internal diameter of 1 inch and rapidly brought to a temperature of 800° C. Nitrogen gas was then passed upwards through the furnace at the rate of 300–400 ml. per minute for a period of two hours while the temperature of the furnace was raised steadily from 800°–1900° C.

The particles recovered in this way were then analyzed with the results shown in the table.

TABLE I

| | Aggregates formed by— | |
|---|---|---|
| | Compaction | Extrusion of paste |
| Percent by weight: | | |
| N | 30.5 | 30.3 |
| Al | 63.8 | 62.2 |
| Zn | 0.6 | 0.06 |
| C | 2.8 | 3.4 |
| Free metal, Al | 0.28 | 0.20 |

Theoretical values for AlN:

| | Percent by wt. |
|---|---|
| Al | 66 |
| N | 34 |

EXAMPLE 2

A mixture containing 20% by weight zinc oxide, 73% by weight aluminum and 7% by weight carbon was formed into aggregates by extrusion as previously described and the aggregates then nitrided in the same way as described in Example 1. Analytical results for the product were as set out in Table II.

TABLE II

| | Percent by wt. |
|---|---|
| N | 26.6 |
| Al | 66 |
| Zn | 0.1 |
| C | 3 |

In a similar manner, silicon can be nitrided to produce silicon nitride. Cadmium oxide can also replace zinc oxide as the reducible metal compound with similar results.

Various changes and modifications of the invention can be made and, to the extent that such variations incorporate the spirit of this invention, they are intended to be included within the scope of the appended claims.

What is claimed is:

1. The process for producing a refractory metal nitride selected from the group consisting of the nitrides of aluminum, boron, silicon, titanium, zirconium, hafnium, and niobium which comprises forming a mixture of said refractory metal, carbon and a compound of zinc or cadmium which is capable of carbothermic reduction to the elemental metal and which acts as a carrier or disperser for said refractory metal, contacting said mixture with nitrogen at a temperature sufficient for the carbothermic reduction of said compound of zinc or cadmium, and evaporating the elemental metal formed, thereby leaving said refractory metal nitride, the amount of carbon in said mixture being in excess of that stoichiometrically necessary for the carbothermic reduction of said compound of zinc or cadmium.

2. The process according to claim 1 in which zinc oxide is said reducible compound.

3. The process according to claim 1 in which said mixture is heated to a temperature of at least about 950° C.

4. The process according to claim 1 in which said mixture is heated at a temperature of 800° C. and then gradually raised to about 1900° C.

5. The process according to claim 1 in which said refractory metal is aluminum.

6. The process according to claim 1 in which said refactory metal is silicon.

7. The process for producing aluminum nitride which comprises forming an intimate admixture of aluminum, carbon and zinc oxide, maintaining a stream of nitrogen gas in contact with said admixture while heating at a temperature of about 800° C. and then gradually raising said temperature up to about 1900° C., the amount of carbon in said admixture being in excess of that stoichiometrically necessary for the carbothermic reduction of said zinc oxide to zinc, said zinc oxide acting as a carrier or disperser for said aluminum during the formation of said aluminum nitride.

8. The process according to claim 7 in which said admixture is in the form of aggregates.

9. The process acording to claim 7 in which said aluminum has a particle size of about 100 microns or smaller.

10. The process according to claim 1 in which cadmium oxide is said reducible compound.

References Cited

UNITED STATES PATENTS

| 1,135,232 | 4/1915 | Weintraub | 23—191 |
| 3,397,958 | 8/1968 | Perieres et al. | 23—192 |

OSCAR B. RODMAN, Primary Examiner

C. B. RODMAN, Assistant Examiner

U.S. Cl. X.R.

423—412, 290, 411, 409